No. 672,644. Patented Apr. 23, 1901.
A. F. MADDEN.
CONTROLLER FOR VEHICLE STEERING MECHANISM.
(Application filed Oct. 3, 1900.)
(No Model.) 5 Sheets—Sheet 2.
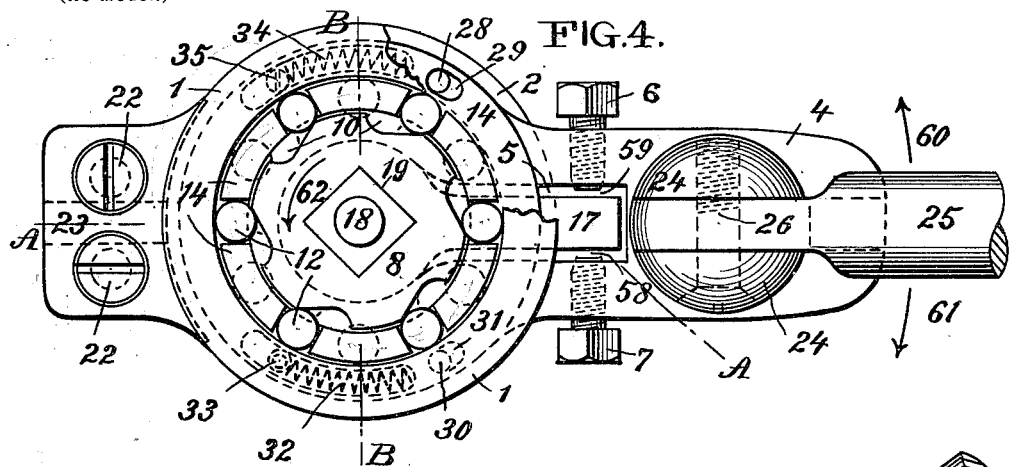
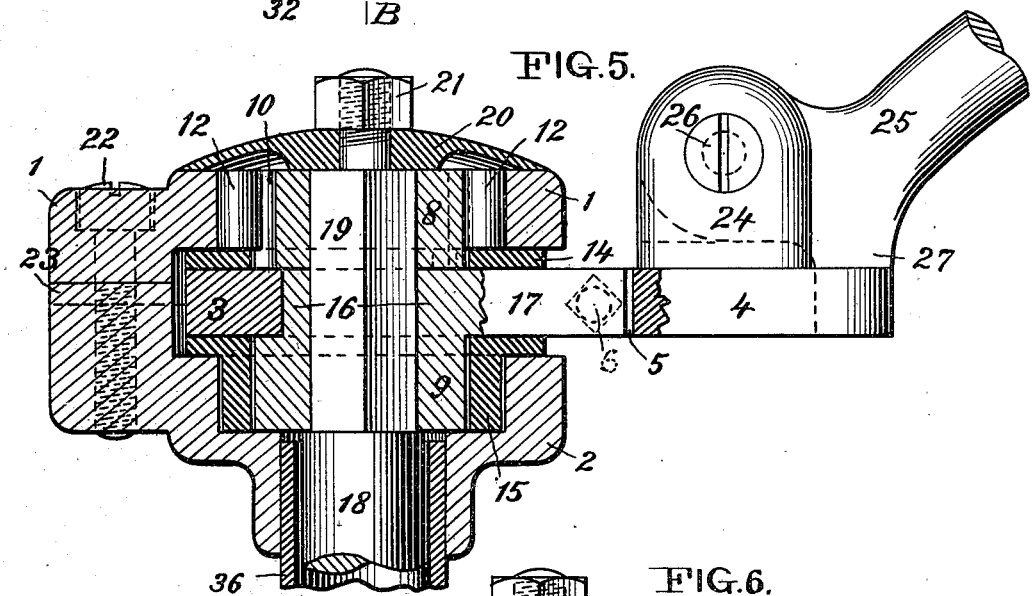
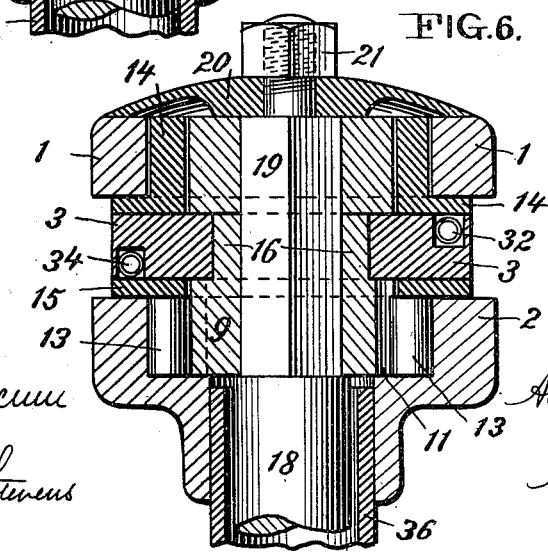
WITNESSES:
Kenneth H. Slocum
Arthur L. Stevens
INVENTOR
Albert F. Madden,
BY
Alvin K. Goodwin,
ATTORNEY

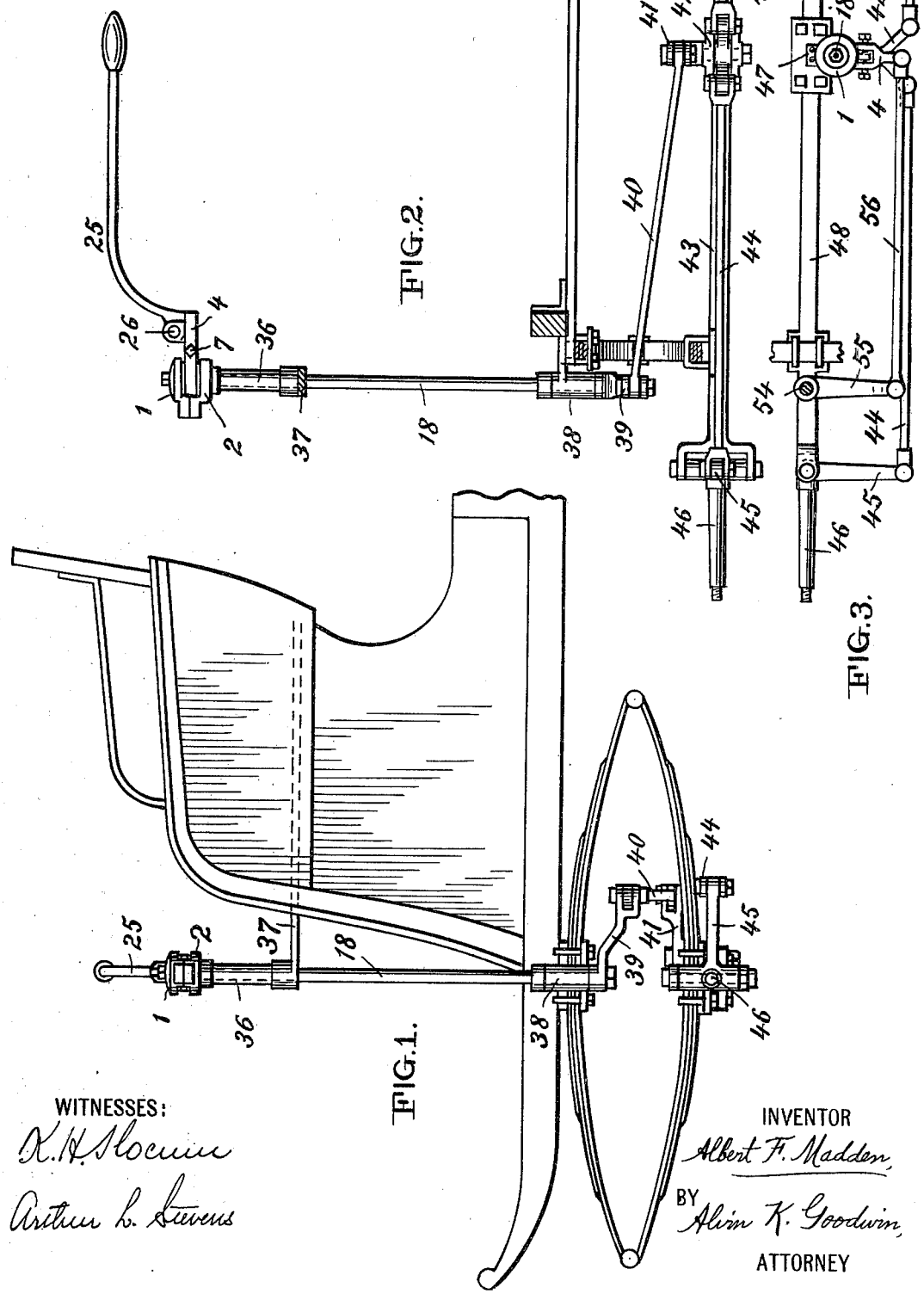

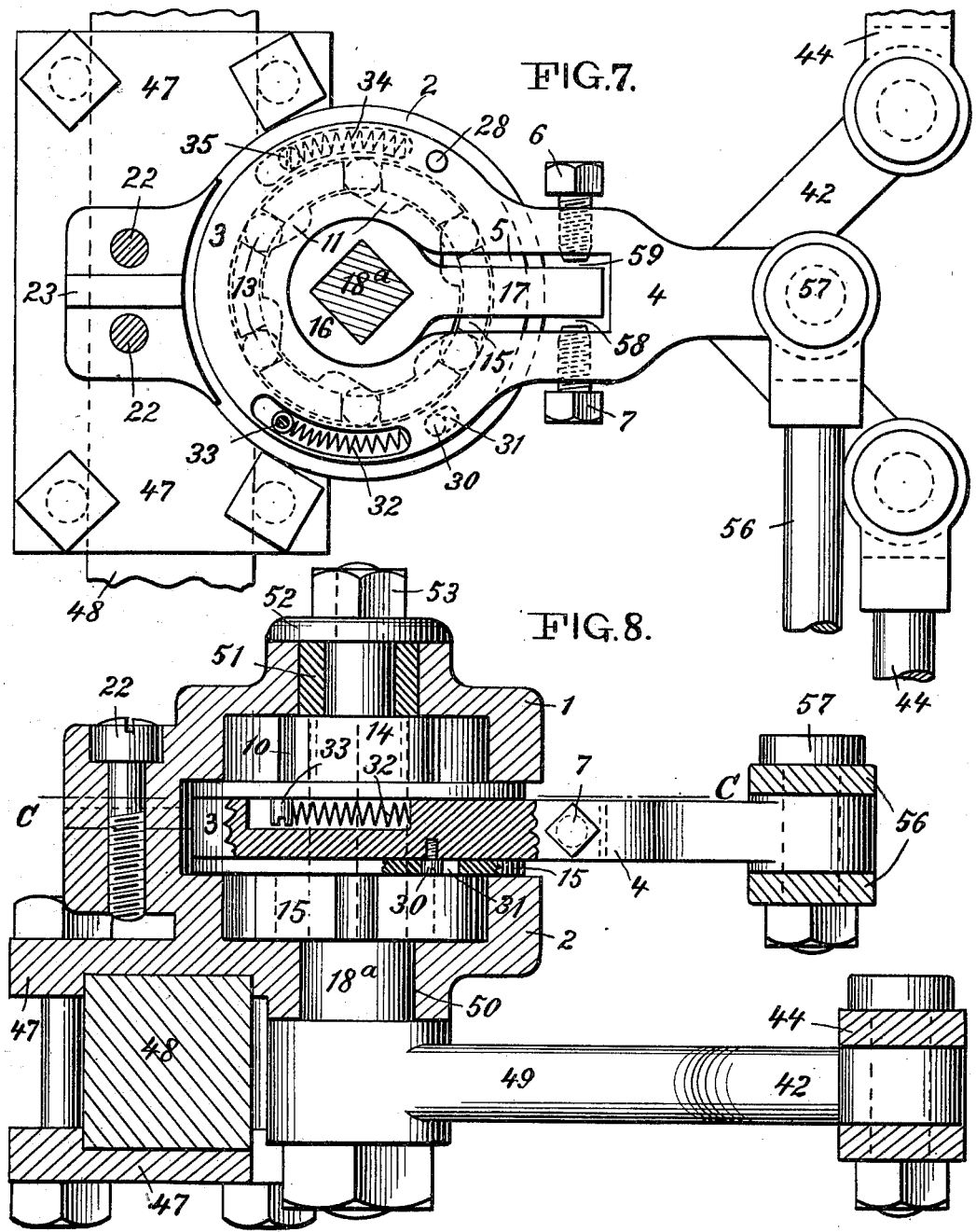

No. 672,644. Patented Apr. 23, 1901.
A. F. MADDEN.
CONTROLLER FOR VEHICLE STEERING MECHANISM.
(Application filed Oct. 3, 1900.)
(No Model.) 5 Sheets—Sheet 4.
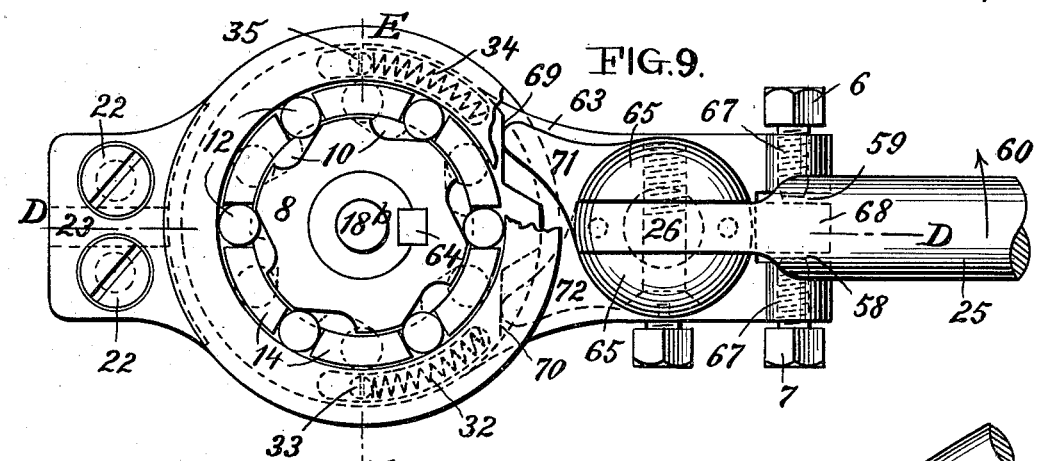
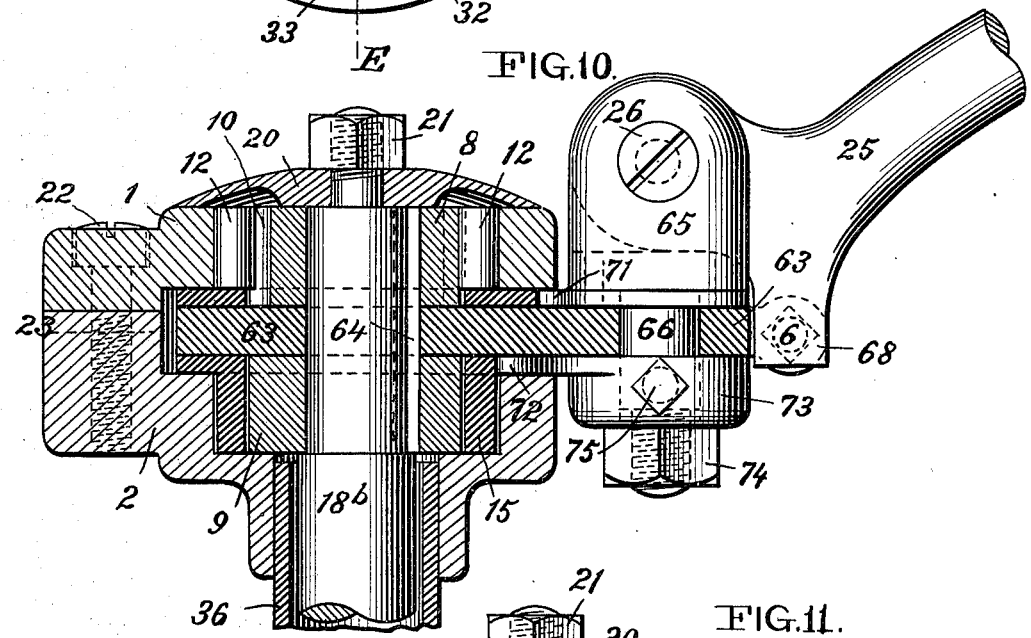
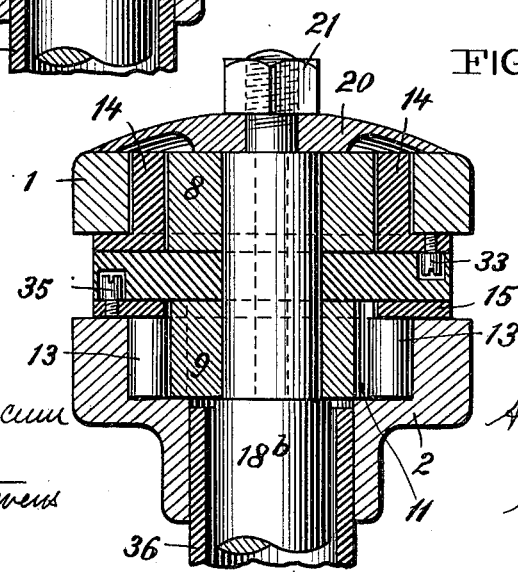
WITNESSES:
INVENTOR
Albert F. Madden,
BY
Alvin K. Goodwin,
ATTORNEY No. 672,644. Patented Apr. 23, 1901.
A. F. MADDEN.
CONTROLLER FOR VEHICLE STEERING MECHANISM.
(Application filed Oct. 3, 1900.)
(No Model.) 5 Sheets—Sheet 5.
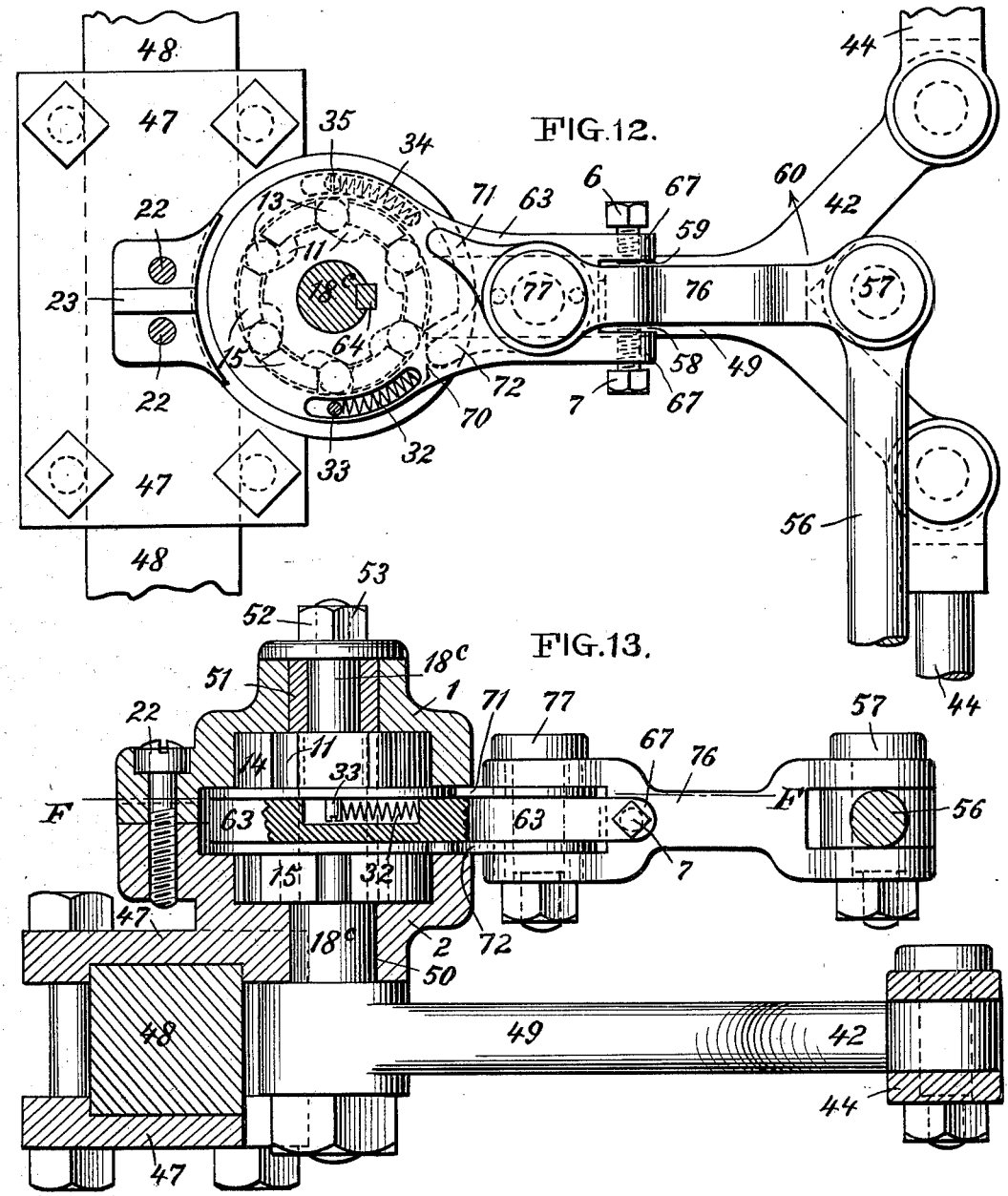
WITNESSES:
Kenneth H Slocum
Arthur L. Stevens
INVENTOR
Albert F. Madden,
BY
Alvin K. Goodwin,
ATTORNEY

UNITED STATES PATENT OFFICE.

ALBERT FRANKLIN MADDEN, OF NEWARK, NEW JERSEY.

CONTROLLER FOR VEHICLE STEERING MECHANISM.

SPECIFICATION forming part of Letters Patent No. 672,644, dated April 23, 1901.

Application filed October 3, 1900. Serial No. 31,912. (No model.)

*To all whom it may concern:*

Be it known that I, ALBERT FRANKLIN MADDEN, a citizen of the United States of America, residing at the city of Newark, in the county of Essex and State of New Jersey, have invented certain new and useful Improvements in Controllers for Vehicle Steering Mechanisms, of which the following is a specification.

My invention relates to devices for controlling the movements of vehicles, motor-vehicles more particularly, and has for its object to provide simple, inexpensive, and efficient mechanism which automatically prevents swerving of the vehicle steering wheel or wheels from their intended position and direction of travel should said wheel or wheels strike an obstruction or irregularity of the road. My improved steering mechanism controller also relieves the steersman of the violent shocks or jars usually brought upon a steering-lever when the wheels strike an obstruction, and therefore the steersman always has perfect and easy control of the vehicle.

My invention is applicable to various forms of vehicle steering mechanisms; but is specially desirable when applied in combination with a lever or "tiller" steering device, which is generally preferred over a self-locking screw-operated mechanism, because of the directness and promptness of its action in swinging the steering wheel or wheels for guiding the vehicle.

Reference is made to the accompanying drawings, forming part of this specification, and in which—

Figure 1 is a side elevation of front portions of a light vehicle having a preferred arrangement of my improved steering mechanism controller as applied directly at the steering-lever. Fig. 2 is a detail vertical sectional elevation taken at right angles to Fig. 1. Fig. 3 is a detail plan view illustrating another arrangement of the preferred controller at the main axle, to which the steering-wheel stub-axles are pivoted. Fig. 4 is an enlarged and nearly full size plan view of the controller and steering-lever shown in Figs. 1 and 2, but with the clutch-casing cap and nut removed and with said casing and the steering-lever partly broken away. Fig. 5 is a vertical sectional elevation taken on the line A A in Fig. 4. Fig. 6 is a vertical sectional view taken on the line B B in Fig. 4. Fig. 7 is an enlarged plan view of the controller and immediate connections applied to the wheel-axle, as in Fig. 3, but with the upper clutch devices and their cap removed and with parts in horizontal section on the line C C in Fig. 8. Fig. 8 is a vertical sectional side elevation of this controller and connections with all parts in normal positions. Fig. 9 is a partly-broken plan view of a modified form of the controller with the clutch-casing cap removed. Fig. 10 is a vertical sectional elevation taken on the line D D in Fig 9. Fig. 11 is a vertical sectional view taken on the line E E in Fig. 9. Fig. 12 is a plan view of this modified controller and immediate connections as applied to the wheel-axle, with the casing-cap removed and with parts in horizontal section on the line F F in Fig. 13; and Fig. 13 is a vertical sectional side elevation of the modified controller and connections.

According to my invention I use two reversely-acting clutches and automatic clutch releasing or tripping devices operating between the steering-lever and the shaft controlling the connections to the steering-wheel axles. The drawings represent a well-known form of roller-clutches which have heretofore been used in ratchet-drills and other mechanisms. I briefly describe said preferred roller-clutches and related mechanism with more special reference to Figs. 4, 5, and 6 of the drawings, showing the preferred controller mechanism, as follows:

In a steel casing, preferably comprising upper and lower main parts 1 2, is placed a central steel plate 3, having an outwardly-extending arm 4 and an interior keyhole-shaped slot or opening 5. The plate carries opposite stops, preferably made adjustable and in the form of set-screws 6 7, the ends of which project at or into the elongated portion of slot 5. Within the casing 1 2, at opposite faces of plate 3, are arranged two steel collars 8 9, having at their respective edges any desired number of reversely-inclined pockets 10 11, receiving clutch-rollers 12 13, respectively. These rollers are held loosely in openings made in the vertical walls of two loose steel cages 14 15, lying upon opposite faces of the central plate 3. The cages are adapted to be turned for releasing the clutch-rollers, as hereinafter more fully explained.

The lower-clutch collar 9 has formed on it an upward projection or boss 16, which loosely fits the rounded part of the slot 5 of plate 3, and also has a lateral extension or finger 17, which is narrower than the elongated portion of slot 5, so as to have play therein between the two plate-stops 6 7. Both clutch-collars 8 9 and the projection 16 on collar 9 are arranged on a vertical shaft 18, so as always to turn with said shaft and preferably by fitting the parts 8 9 16 upon a squared or flat-sided end portion 19 of the shaft. A cap 20, held by a nut 21 to the reduced end of the shaft, conceals and protects the clutch mechanism. I prefer to hold the clutch-casing sections 1 2 together by two off-center bolts 22 22, between which these sections have a tongue-and-grooved connection at 23, thus preventing independent rotation of parts 1 2. The plate-arm 4 has two lugs 24, to and between which the steering lever or tiller 25 is pivoted on a bolt 26, so as to be thrown over backward in the usual manner to facilitate seating of a passenger or steersman. The lever may have a lug 27, entering a notch at the end of plate extension 4 to relieve the pivot 26 of excessive strains.

The central plate 3 carries an upwardly-projecting pin 28, entering a slot 29 in the flange of the upper-roller cage 14, and plate 3 also carries a downwardly-projecting pin 30, entering a slot 31 in the flange of the lower-roller cage 15. A spring 32, held in a curved slot of plate 3, expands against a pin 33 in the upper-roller cage 14, and a spring 34, held in another curved slot of plate 3, expands against a pin 35 in the lower-roller cage 15. These springs 32 34 move the respective roller-cages 14 15 to normally carry the clutch-rollers 12 13 up the inclines of the cam-recesses of the respective collars 8 9 in a well-known manner. The slots 29 30 in plate 3 permit slight rotation of the respective roller-cages for releasing the upper and lower clutches by slight initial or advance movements in opposite directions of the pin-carrying plate 3 4, which is turned by the steering-lever 25 to guide the vehicle, as hereinafter described.

For lighter vehicles, and as shown in Figs. 1 and 2 of the drawings, I may fix the controller-clutch casing at its lower part 2 directly to a tube 36, which surrounds the shaft 18 and is fixed to a strong metal arm 37, fastened to the seat-frame of the vehicle. The shaft 18 has a lower bearing 38 on the body bed-frame and carries an arm 39, which couples by a rod 40 to an arm 41 on a rocking yoke 42, pivoted at the main axle 43. From this yoke 42 equalizer-rods 44 pass to arms 45, projecting from the pivoted stub-axles 46, on which the steering-wheels (not shown) are mounted in the usual manner, so as to be turned as the shaft 18 is turned by the steering-lever 25.

For heavier vehicles, and as shown in Figs. 3, 7, and 8 of the drawings, I provide the lower-clutch casing portion 2 with clip-plates 47, which are bolted directly to the main axle 48. In this case the shorter controller-shaft (marked $18^a$) is fixed to an extended arm 49 of the yoke 42, which thus moves with said shaft and gives motion by equalizer-rods 44 and arms 45 to the stub-axles 46 and the steering-wheels. In this case the shaft $18^a$ bears far more lateral strain than the shaft 18 in Figs. 1 and 2 of the drawings, and therefore I give the shaft $18^a$ good bearings at 50 in the clutch-casing part 2 and in a bushing 51, fitted in the upper-clutch casing portion 1. A washer 52 is held over the parts 1 51 by a nut 53 on the reduced upper end of the shaft. This shaft $18^a$ is combined with cam-recessed collars 8 9, cages 14 15, and clutch-rollers 12 13, substantially as above described, for the steering-controller of the lighter vehicle. When the controller is thus applied at the axle, it is operated by a lever (not shown) at the upper end of an auxiliary vertical shaft 54, having a bearing on the vehicle-body and carrying an arm 55, from which a rod 56 passes to be pivoted at 57 to the lateral extension 4 of the controller-plate 3.

I will describe the operation with more special reference to Figs. 1, 2, 4, 5, and 6 of the drawings. Normally there are clearance-spaces 58 59 between the stops 7 6 on plate 3 and the finger 17 of the boss 16 on the lower-clutch collar 9, as most clearly shown in Fig. 4. Supposing the steersman wishes to turn the vehicle to the left hand more or less, he will move lever 25 from him in the direction of the arrow 60 in Fig. 4. This turns the plate 3 4 in like direction, and the first effect will be to cause the plate-pin 28, by acting in the slot 29 of the roller-cage 14, to turn this cage slightly but sufficiently to carry the upper-clutch rollers 12 around toward the deeper ends of the recesses 10 of clutch-collar 8, and thereby release or make inoperative the upper clutch. The slot 31 of the lower-roller cage 15 permits this operation without disturbing the lower-clutch rollers 13, because the plate-pin 30 has free travel in said slot 31, and consequently the lower clutch 9, 13, 15 also remains inoperative. This preliminary release or adjustment of the clutch mechanism in advance of the turning of shaft 18 by the steering-lever 25 is permitted because as the plate 3 4 is moved by said lever the stop 7 must first traverse the slight clearance-space 58 between it and the tongue 17 of the clutch-collar 9. The instant the plate-stop 7 strikes this tongue 17 the lever 25, through the medium of plate 3 4, stop 7, tongue 17, and portions 9 16 of the lower clutch, will turn the shaft 18 to adjust the steering-wheels as desired for guiding the vehicle to the left hand. For guiding the vehicle to the right hand the steering-lever 25 will be moved in the direction of the arrow 61 in Fig. 4. This causes plate-pin 30, by acting in the slot 31 of the lower-roller cage 15, to move this cage and release the lower-clutch rollers 13, while the upper plate-pin 28 moves freely in slot 29 of the undisturbed upper-clutch roller-cage 14, thereby again making both clutches inoperative, and the instant the plate-stop 6 after traversing the clearance-space 59 strikes the tongue 17 the shaft 18 will be turned by part 9 16 to the right for steering the vehicle to the right hand, as desired. Should the left-hand steering-wheel strike an obstruction, the tendency would be to turn the shaft 18 in the direction of the arrow 62 in Fig. 4; but this tendency would be instantly checked and the steering-wheels would be locked by engagement of the upper-clutch rollers 12 by and between the cam-recesses 10 of the collar 8 and the clutch-casing. Should the right-hand steering-wheel strike an obstruction, the tendency would be to turn shaft 18 in the reverse direction of the arrow 62; but this tendency would be instantly checked and the steering-wheels would again be locked by engagement of the lower-clutch rollers 13 between the cam-recesses 11 of the collar 9 and the clutch-casing.

The operation of the controller (shown in Figs. 3, 7, and 8 of the drawings) is similar to that above described when the controller-plate 34 is moved in one direction or the other by the rod 56, actuated indirectly by a steering lever or device.

It is obvious that the steering-wheels will be automatically and instantly locked should either wheel strike an obstruction, and that the steersman will be practically relieved of the violent jars or shocks usually attending the striking of obstructions by steering-wheels connected to the steering-lever without intervening locking or buffer mechanism, while the steering-lever of my invention may always be freely manipulated for steering the vehicle in any desired direction. The lost motion at the clearance-spaces 58 59 permitting preliminary release of the clutch mechanism is so slight as scarcely to be noticed by the steersman.

In the modified controller shown in Figs. 9, 10, and 11 of the drawings the central plate 63, having uniform thickness, and the two clutch-collars 8 9, carrying the reversely-inclined cam-recesses 10 11, are all keyed at 64 to a reduced portion of the shaft $18^b$, and the steering-lever 25 is pivoted at 26 to and between lugs 65 65, fixed to or forged on the head of a stud 66, journaled in the projecting end of plate 63. This plate has an end notch or opening providing lugs 67 67, in which are fitted the screw-stops 6 7, which coöperate with a pendent lug 68 on the lever 25. The clearance-spaces 58 59 are provided between the stops 7 6 and lever-lug 68. The respective clutch-roller cages 14 15 are acted on by springs 32 34 and have peripheral notches with faces 69 70, respectively, and inclined relatively to the trips 71 72 of the stud 66. The lower trip 72 is preferably fixed to a collar 73, which is held to the pivot-stud 66 by an end nut 74 on the stud and by a set-screw 75, permitting assembling and uncoupling of the parts. The upper trip 71 is preferably forged in one piece with the stud and its head and the lever pivot-lugs 65. The shaft $18^b$ is presumably connected to the pivoted yoke from which equalizer-rods run to arms on the pivoted stud-axles of the steering-wheels, substantially as above described. When this modified controller is clipped to the axle 48, as shown in Figs. 12 and 13 of the drawings, I couple the operating-rod 56 by a pin 57 to a link 76, to which the trips 71 72 are pinned near a pivot 77, which couples the link to the end extension of the plate 63. In this case the modified shaft $18^c$, to which parts 8 9 63 are keyed, has lower and upper bearings 50 51 like the bearings in Fig. 8 of the drawings. The link 76 enters between the plate-stops 7 6, whereat the clearance-spaces 58 59 are provided. It is obvious that whether this modified controller be operated directly by the steering-lever 25, as in Figs. 9, 10, and 11, or by the rod 56 and link 76, as in Figs. 12 and 13 of the drawings, a movement of lever 25 or link 76 in the direction of arrow 60 will cause trip 71, by acting on the notch-face 69 of clutch-cage 14, to preliminarily release the upper clutch, thus leaving both upper and lower clutches free to permit the steering-shaft $18^b$ or $18^c$ as the lug 68 or link 76 strikes the stop 6 to be turned for steering the vehicle to the left hand. A movement of part 25 or 76 in the opposite direction will cause trip 72 by action on notch-face 70 of clutch-cage 15 to release the lower clutch and leave both clutches again inoperative to allow movement of the steering-wheels for travel to the right hand after the lever-lug 68 or link 76 strikes the stop 7. Should either steering-wheel strike an obstruction, the wheels will be automatically locked by the clutch mechanism, substantially as above described. In this modified controller the steering-shaft $18^b$ or $18^c$ is turned by the plate 63, acting at the key 64. In the first-described controller the shaft 18 is turned by engagement of the clutch-collar 9 and its boss 16, providing together a much larger bearing-surface to resist the strains, and this is one reason why the more simple and direct-acting construction shown in Figs. 1, 2, 4, 5, and 6 of the drawings is preferred in practice.

I claim as my invention—

1. A controller for vehicle steering mechanisms, comprising a manually operative steering device, intermediate connections between said device and the steering-wheels for actuating said wheels and including a shaft receiving the shocks from the obstructed steering-wheels, two independent reversely-acting clutch mechanisms lying in different planes and normally locking the steering-wheels at said shaft, and tripping devices for said clutch mechanisms including a plate lying in a plane between the two clutch mechanisms and through the medium of which plate the tripping devices are operative from the steering device to assure release of either clutch mechanism before said steering device actuates the steering-wheels for guiding the vehicle.

2. A controller for vehicle steering mechanisms, comprising a manually operative steering device, intermediate connections between said device and the steering-wheels for actuating said wheels and including a shaft receiving the shocks from the obstructed steering-wheels, two clutch mechanisms arranged in different planes and comprising two reversely-arranged inner clutch members fixed to said shaft, two opposing outer clutch members and interposed movable clutch members acting with said inner and outer clutch members; an interposed plate lying in a plane between the two clutch mechanisms and movable from the steering device, and tripping devices for the intermediate clutch members operative by the steering device through the medium of the interposed plate and releasing either clutch mechanism before said steering device actuates the steering-wheels for guiding the vehicle.

3. In a controller for vehicle steering mechanisms, the combination, with a shaft, a steering device operating said shaft, and connections imparting to the shaft the shocks from the obstructed steering-wheels, of a clutch-casing fixed to the vehicle-frame and around the shaft, two reversely-arranged inner clutch members fixed in different planes to the shaft, movable clutch members between the inner clutch members and the clutch-casing, a movable plate lying in a plane between the two inner clutch members, and tripping devices for the two clutches operative by or from the steering device; one of said inner clutch members having a finger adapted for engagement by the plate or by stops thereon and arranged to normally provide clearance-spaces permitting initial release of the clutches before the shaft is turned by the steering device for guiding the vehicle.

4. In a controller for vehicle steering mechanisms, the combination, with a shaft and connections therefrom to the steering-wheels, of a clutch-casing surrounding the shaft, reversely-arranged clutch members 8, 9, fixed to the shaft, one of said parts 8, 9 having a finger 17, a plate 3 4 interposed between parts 8, 9, and having a slot 5 receiving finger 17, and providing clearance-spaces thereat, clutch-rollers 10, 13, interposed between the clutch-casing and parts 8, 9, respectively, cages 14, 15, adapted to release rollers 10, 13 respectively, means operating said cages from the plate 3 4, and a steering device held to said plate, substantially as described.

5. In a controller for vehicle steering mechanisms, the combination, with a shaft and connections therefrom to the steering-wheels, of a clutch-casing surrounding the shaft, reversely-arranged clutch members 8, 9, fixed to the shaft, one of said parts 8, 9 having a finger 17, a plate 3 4 interposed between parts 8, 9, and having a slot 5 receiving finger 17, and providing clearance-spaces thereat, clutch-rollers 10, 13, interposed between the clutch-casing and parts 8, 9, respectively, cages 14, 15, adapted to release rollers 10, 13 respectively and having slots 29, 31, respectively, pins 28, 30, in the plate 3 4 entering said slots, springs normally restoring the cages to initial positions, and a steering device held to the plate 3 4, substantially as described.

ALBERT FRANKLIN MADDEN.

Witnesses:
A. J. DOTY,
ARTHUR L. STEVENS.